United States Patent [19]

Hoppie et al.

[11] Patent Number: 4,672,938
[45] Date of Patent: Jun. 16, 1987

[54] METHOD AND APPARATUS FOR MULTIPHASIC PRETREATMENT OF FUEL TO ACHIEVE HYPERGOLIC COMBUSTION

[75] Inventors: Lyle O. Hoppie, Birmingham; Richard Chute, Troy; David H. Scharnweber; Kenneth P. Waichunas, both of Milford, all of Mich.

[73] Assignee: Eaton Corporation, Cleveland, Ohio

[21] Appl. No.: 813,881

[22] Filed: Dec. 26, 1985

[51] Int. Cl.⁴ ...................... F02M 31/18; F02M 33/00
[52] U.S. Cl. ..................................... 123/538; 123/558
[58] Field of Search ................................ 123/536–539, 123/557, 558

[56] References Cited

U.S. PATENT DOCUMENTS

| | | |
|---|---|---|
| 1,262,886 | 4/1918 | Wemple . |
| 1,347,631 | 7/1920 | Herck . |
| 1,876,168 | 9/1932 | Richardson . |
| 2,108,706 | 2/1938 | Crillon . |
| 2,110,062 | 3/1938 | Gibson . |
| 2,166,266 | 7/1939 | Schmitt . |
| 2,407,729 | 9/1946 | Taylor . |
| 2,418,175 | 4/1947 | Higginbotham . |
| 2,435,213 | 2/1948 | Hancock . |
| 2,586,278 | 2/1952 | Waters . |
| 2,667,605 | 1/1954 | Massier . |
| 2,855,770 | 10/1958 | Grube . |
| 2,999,534 | 9/1961 | Wagner . |
| 3,044,284 | 7/1962 | Kratzenberger . |
| 3,191,659 | 6/1965 | Weiss . |
| 3,243,631 | 3/1966 | Clark . |
| 3,299,675 | 1/1967 | Laffitte et al. . |
| 3,361,353 | 1/1968 | Millman . |
| 3,518,036 | 6/1970 | Staats et al. . |
| 3,681,002 | 8/1972 | Weller et al. . |
| 3,762,378 | 10/1973 | Bitonti ................... 123/557 |
| 3,765,382 | 10/1973 | Vandenberg . |
| 3,841,824 | 10/1974 | Bethel . |
| 4,043,308 | 8/1977 | Cerkanowicz ............. 123/536 X |
| 4,091,779 | 5/1978 | Saufferer et al. . |
| 4,124,003 | 11/1978 | Abe et al. . |
| 4,201,167 | 5/1980 | Bayley . |
| 4,267,976 | 5/1981 | Chatwin ................... 123/557 X |
| 4,448,176 | 5/1984 | Hoppie ....................... 123/558 |
| 4,503,833 | 3/1985 | Yunick ....................... 123/545 |
| 4,582,475 | 4/1986 | Hoppie ....................... 123/536 X |

FOREIGN PATENT DOCUMENTS

| | | |
|---|---|---|
| 451769 | 10/1927 | Fed. Rep. of Germany . |
| 787893 | 9/1935 | France ....................... 123/538 |
| 26974 | of 1911 | United Kingdom . |

OTHER PUBLICATIONS

"Compact Gas Generator for Fuel Gasification Aboard Motor Vehicles", Frie et al, Siemens Forsch.-u. Entwickl.-Ber. Bd. 7, (1978), Nr. 2.
"The Effect of Plasma Jet Ignition on Flame Propagation and Sooting at the Rich Limit of Flammability", Vince et al, Combustion and Flame, 56:105–112, (1984).
"Lean Times for Old Flames", Weinberg, The Institute of Physics, 1982.
"Plasma Jets in Combustion", Weinberg, I Mech E, 1983, C45/83.
"Chemical Activity and Transport Processes in the Vicinity of a Plasma Jet Igniter", Clements et al, Combustion and Flame, 57:265–274, (1984).
"Hypergolic Combustion in an Internal Combustion Engine", Scharnweber et al, SAE paper 850089, 1985.
"The Influence of Initial Fuel Temperature on Ignition Delay", Hoppie, SAE paper 820356, no date.
"Autothermal Gasification of Liquid Hydrocarbons by Partial Oxidation", Henkel et al. Siemens Forsch.-u. Entwickl.-Ber. Bd. 6, (1977), Nr. 5.
"Gasification of Diesel Fuel for a Low-Emission, High--Efficiency Engine System", Purohit et al, SAE paper 800264, 1980.

Primary Examiner—Tony M. Argenbright
Attorney, Agent, or Firm—J. Gordon Lewis; John R. Benefiel

[57] ABSTRACT

A method and apparatus are disclosed for pretreating fuel prior to its injection into a combustion chamber to a critical level of activation to enable negligible ignition delay and substantially instantaneous completion of the combustion process. Each quantity of fuel is treated in a plurality of phases to achieve the critical level of fuel activation by the combined effect of each, with fuel heating combined with one or more further activation treatment phases, including catalysis, UV irradiation, or passing each quantity of the fuel through an electrical discharge to thereby enable hypergolic combustion by a combination of the effects thereof.

8 Claims, 2 Drawing Figures ature on the order of or in excess of 1000° F., this

METHOD AND APPARATUS FOR MULTIPHASIC PRETREATMENT OF FUEL TO ACHIEVE HYPERGOLIC COMBUSTION

BACKGROUND OF THE INVENTION

1. Field of the Invention

The present invention concerns combustion devices and more particularly a method and apparatus for pretreating fuel prior to its injection into a combustion chamber of a combustion device, such as an internal combustion piston engine, to achieve hypergolic combustion with only negligible delays in ignition and in completing the combustion process.

2. Description of the Prior Art

It has heretofore been proposed to achieve so called "hypergolic" combustion, particularly of hydrocarbon fuels in an internal combustion engine, such that ignition delay and the time interval required to complete combustion are both negligible after the fuel is introduced into an oxidizing atmosphere.

For a detailed discussion, see U.S. Pat. No. 4,448,176; SAE paper no. 850089 "Hypergolic Combustion in an Internal Combustion Engine", and, SAE paper 820356, "The Influence of Initial Fuel Temperature on Ignition Delay"; each of which are incorporated herein by reference.

Hypergolic combustion has a number of advantages, as detailed in the aforementioned references, particularly in the context of internal combustion reciprocating piston engines.

As also detailed in the aforementioned references, ignition delay is believed to occur due to the need for the fuel molecules to first be dissassociated into radicals in order to combine with oxygen molecules, which themselves must be dissassociated for oxidation to occur. In a typical combustion process, an ignition device such as a spark plug causes a localized increased concentration of fuel radicals in a fuel-air mixture, sufficient for initiation of combustion. The release of heat from the resulting localized combustion in turn causes dissassociation of adjacent fuel molecules to enable combustion to progagate through the entire charge of fuel-air mixture.

As discussed in the aforementioned U.S. Pat. No. 4,448,176, if there is a pretreatment of the fuel such as to cause a dissassociation of a critical proportion of molecules in each quantity of fuel, much higher than the proportion occurring at ambient temperatures, there is an "activation" of the fuel yielding substantially instantaneous ignition and combustion.

In order that such an increased, critical proportion of fuel molecules be dissassociated into radicals, energy must be expended to bring this proportion of the fuel molecules to the relatively high energy state corresponding to the dissassociated condition of the fuel molecules.

As described in the aforementioned U.S. Pat. No. 4,448,176, if fuel is heated to relatively elevated temperature on the order of or in excess of 1000° F., this causes such critical proportion of fuel molecules to be dissassociated to form radicals, since such proportion of the fuel molecules is thereby brought to a high energy state.

In co-pending application Ser. No. 812,863 filed on 12/28/85, assigned to the same assignee as the present application there is described a method and system for heating of the fuel to such elevated temperatures by a regenerative heat exchange process, in which the fuel is circulated through a vessel disposed directly in the combustion chamber, with the combustion chamber insulated to retain heat therein. This arrangement, when combined with preheating of the fuel, as with an exchanger in the engine exhaust system, is able to heat the fuel to such sufficiently elevated temperatures, that upon injection into the combustion chamber, hypergolic combustion will result.

Alternatively, catalysis is utilized to augment the effect on fuel activation of heating alone. A disadvantage of regeneratively heating the fuel is the tendency for cracking of the fuel molecules at high temperatures, and the resultant formation of coke, tending to clog the fuel flow passages. It has been discovered that if the fuel is sustained at the elevated temperatures for only very short time periods this will avoid this problem.

Also, while such aforementioned regenerative heating method and system will efficiently heat the fuel to such elevated temperatures, a relatively complex fuel circulation system is necessitated and the tendency for coke formation is higher due to the longer times required to achieve heating by heat exchange with the products of combustion produced in the prior combustion cycle.

In co-pending application Ser. No. 813,888 filed on 12/26/85 assigned to the same assignee as the present invention, now U.S. Pat. No. 4,644,925, a method of compressive heating of vaporized fuel is disclosed to achieve activated fuel enabling hypergolic combustion, in which catalysis is alternatively utilized to augment the effect achieved by compression heating alone.

Another method of pretreatment of fuel is disclosed in Ser. No. 446,796, filed on Dec. 3, 1982, now U.S. Pat. No. 4,582,475, also assigned to the same assignee as the present application in which a corona discharge is utilized to activate fuel passed therethrough prior to combustion, to achieve activation of the fuel molecules by the formation of radicals.

There has also been disclosed in co-pending application Ser. No. 813,892 filed on 12/26/82, also assigned to the same assignee as the present application, a method of activating fuel by irradiation with ultraviolet radiation to achieve the activation of the fuel to enable hypergolic combustion.

It is an object of the present invention to provide a multiphasic pretreatment of fuel to activate a proportion of fuel molecules sufficient to enable hypergolic combustion.

It is a further object of the present invention to provide such multiphasic pretreatment of fuel that ensures achievement of the critical level of fuel activation with only moderate levels of intensity of each pretreatment phase.

SUMMARY OF THE INVENTION

These and other objects of the present invention, which will become apparent on the reading of the following specifications and claims, is achieved by a multiphasic arrangement and method of treatment of fuel comprised of heating each fuel quantity to enable vaporizing and partial activation of each quantity of fuel. The vaporized, partially activated fuel is then fully activated by one or more further phases of pretreatment; such as by passing the heated vaporized fuel into contact with surfaces of catalytic material; by establishing an electrical field and passing the vaporized fuel through an electrical discharge generated by the electrical field to complete the activation of the fuel, the parameters of the electrical field optionally controlled to generate a corona or an arc discharge through which the fuel is passed; or by irradiation of each quantity of vaporized fuel with ultraviolet radiation.

The combined effects of each treatment phase produces an activation of the fuel to a critical level necessary to enable hypergolic combustion, such that the intensity of activation by each phase is moderated over the activation required solely by any single phase of fuel activating pretreatment.

DETAILED DESCRIPTION

In the following detailed descriptions certain specific terminology will be employed for the sake of clarity and in particular embodiment described, but it is to be understood that the same is not intended to be limiting and as indeed the invention may be practiced in a variety of forms and variations within the scope of the appended claims.

Figure 1:
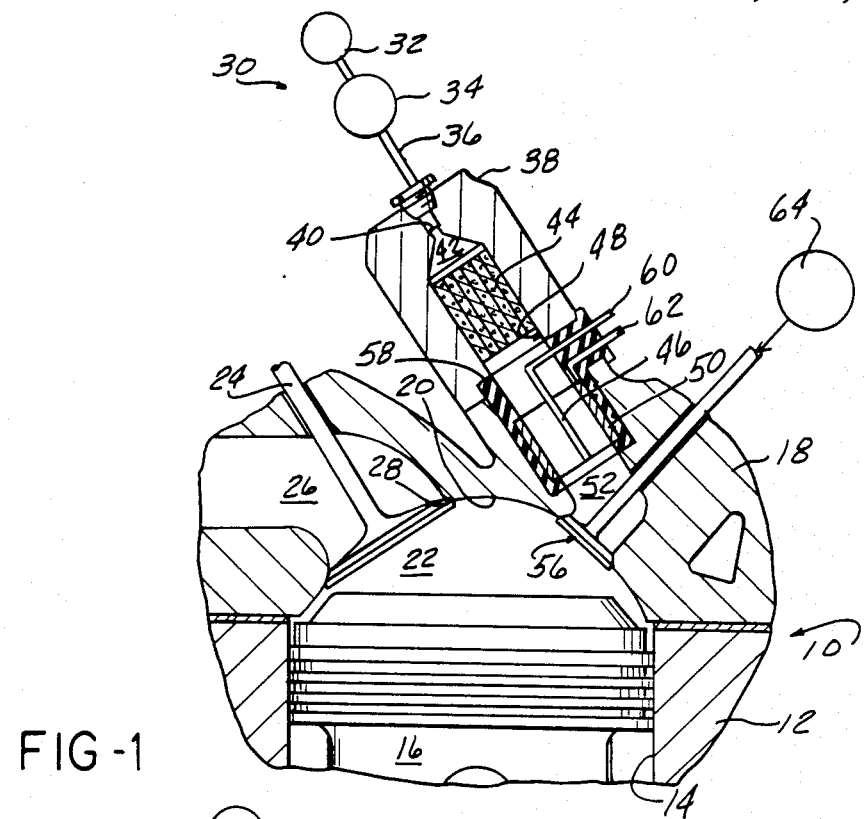
FIG. 1 is a partially sectional fragmentary view of an internal combustion engine incorporating a fuel pretreatment arrangement according to the present invention.

Referring to FIG. 1, a multiphasic arrangement for pretreatment of fuel to achieve critical activation thereof, as described above, is depicted applied to a combustion device taking the form of an internal combustion engine 10, of a reciprocating piston type, which includes an engine block 12 and a bore 14 machined therein, which receives a piston 16 adapted to be reciprocated in the bore 14 as by means of the conventional crankshaft (not shown). The engine is also provided with a cylinder head 18 having internal surfaces 20 partially defining a combustion chamber 22 when taken together with the end face of the piston 16 and adjacent surfaces of the cylinder bore 14.

An air intake and exhaust system is intended to be incorporated for enabling the inflow of air to the combustion chamber 22 and outflow of the products of combustion with each combustion cycle. An intake valve 24 is shown adapted to control communication with an air intake passage 26 formed in the cylinder head 18 as shown, by movement of the intake valve 24 on and off a valve seat 28 by suitable valve operating mechanism (not shown).

A corresponding exhaust valve and exhaust passage are provided but not shown in FIG. 1 since such exhaust systems are very well known to those skilled in the art and do not form a part of the present invention.

A fuel delivery system 30 is provided for the delivery of a fuel charge into the combustion chamber 22 will each combustion cycle. According to the present invention, combustion proceeds hypergolically within the combustion chamber 22.

As developed in the above cited references, activation of the fuel to a critical level is required in order to achieve hypergolic combustion. According to the concept of the present invention, multiphasic treatment of the fuel is provided in order to achieve sufficient combined activation resulting from pretreatment with a plurality of pretreatment phases, each of which operated is at relatively moderate levels.

Accordingly a source of fuel 32 is provided, supplying fuel under pressure to a suitable heater means indicated diagrammatically at 34, which may take a form of a heat exchanger disposed to extract heat from the engine exhaust gases or by any other suitable auxiliary heating means.

The heating of the fuel achieves a partial activation of the fuel molecules and the fuel thereafter will pass through passage 36 and into body 38 formed with a nozzle 40 adapted to vaporize the heated fuel received from passage 36, passing the same into a catalytic treatment chamber 42. Catalytic treatment chamber 42 formed in the body 38 has disposed therein a bed of catalytic material 44 such as a spongey or porous mass having surfaces coated or plated with a catalytic material such as platinum metal. The vaporized, partially activated heated fuel passing through the catalytic body 44 is further partially activated causing a dissassociation of a further proportion of fuel molecules into free radicals, accomplishing a further proportion of the fuel activation required.

According to the embodiment shown in FIG. 1, an arrangement is provided for generating an electrical field through which the vaporized fuel is passed to be partially activated by the effect of the electric field, to augment the aforementioned partial activation and achieve full activation of the vaporized fuel prior to injection into the combustion chamber 22.

The electric field may achieve partial fuel activation by generation of a plasma or arc discharge, or may be operated to generate a corona through which the fuel is passed as disclosed in Ser. No. 446,796 referred to above. Such a field is generated by a center electrode 46 disposed in a passage 48 formed in the body 38 and cylinder head 18, surrounded by a cylindrical electrode 50 defining an intervening space therebetween through which the fuel passes into a valve chamber 52, immediately adjacent a valve member 56 controlling communication between the valve chamber 52 and the combustion chamber 22.

Cylindrical electrode 50 is electrically isolated by means of a insulator sleeve 58 interposed between electrode 50 and bore 48. Power supply terminals 60 and 62 are connected to the electrode 46 and 50 respectively for connection to a suitable power supply such as a 10,000 volt, one-watt power source (not shown).

As detailed in the aforementioned application Ser. No. 446,796, the voltage is set such that a corona is established at the intermediate space between electrodes 46 and 50. Fuel then passes through the corona and partial activation of the fuel molecules occurs such that the multiphasic effect of the heating, catalytic contact, and passage through the corona achieves full activation of the fuel, which then enters the combustion chamber 22 in a condition to cause hypergolic combustion thereof. That is, substantially instantaneous ignition and combustion occur upon mixing with the previously inducted air in combustion chamber 22.

The valve 56 may be controlled by a suitable valve operating mechanism indicated schematically at 64 to control the timing and rate of inflow of activated fuel into the combustion chamber 22 for optimum efficiency.

Figure 2:
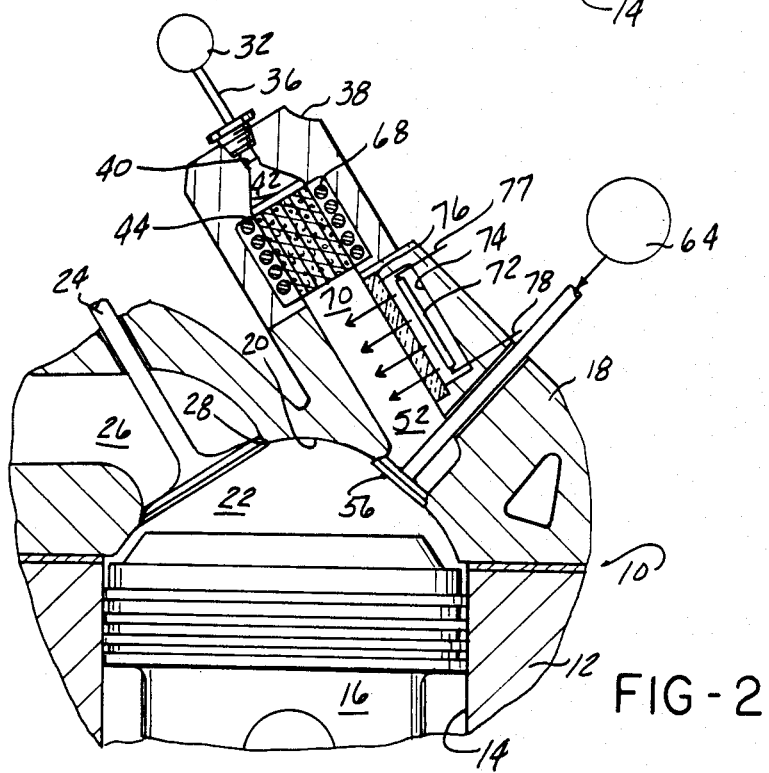
FIG. 2 is a partially sectional fragmentary view of an internal combustion engine incorporating an alternate embodiment of the multiphasic fuel pretreatment arrangement according to the present invention.

Referring to FIG. 2 an alternate embodiment is depicted in the same context of an internal combustion engine 10 shown in FIG. 1. In this embodiment, a source of fuel under pressure 32 directly passes fuel into a supply passage 36, with the fuel vaporized by a nozzle 40 formed in body 38 in passing into catalytic chamber 42. Catalytic chamber 42 contains a catalytic bed 44 of suitable porous or spongy configuration allowing passage therethrough of the vaporized fuel. The fuel and catalytic bed 44 may be simultaneously heated by means of a heating coil 68 surrounding the catalytic chamber 42 and catalytic bed 44 such that heating and catalytic treatment are carried out substantially simultaneously, each partially activating the vaporized fuel passing therethrough.

Aligned with catalytic chamber 42 is an irradiation chamber 70 formed in the body 38 and cylinder head 18 into which the partially activated vaporized fuel passes. Means are provided for irradiating the fuel passing therethrough with ultraviolet radiation, which may take the form of a mercury vapor lamp 72 mounted in a chamber 74, closed by means of a window 76, isolating the chamber 74 from the fuel flow passage 70. Window 76 is constructed of a suitable material so as to be transparent to the transmission of ultraviolet radiation. Leads 77 and 78 may be connected to a suitable power supply in order to energize the mercury vapor lamp 72 and cause irradiation of the partially activated fuel as it passes through the irradiation chamber 70. The fuel passes to the valve chamber 52 as in the above described embodiment with injection controlled by the valve 56 and valve actuator 64 as in the above described embodiment.

Accordingly it can be appreciated that the above recited objects of the present invention have been accomplished by the arrangements and methods described in that a three-phase pretreatment activation of the fuel is accomplished such that each phase may be practiced at moderate levels while insuring complete activation of the fuel to the critical levels required in order to achieve the hypergolic combustion.

We claim:

1. An arrangement for multiphasic pretreatment of fuel prior to combustion in a combustion device comprising:
    a source of fuel under pressure;
    first means for heating and vaporizing fuel received from said source of fuel;
    catalytic activation means comprising a catalytic material disposed to partially activate said heated and vaporized fuel to a degree insufficient when combined with the activation effect of said first means to enable hypergolic combustion;
    means for generating an electrical discharge and passing said heated, vaporized, and catalytically treated through said electrical discharge, said discharge of sufficient intensity to activate the entire mass of fuel to a degree sufficient to enable hypergolic combustion.

2. The arrangement according to claim 1 wherein said means for generating said electrical discharge comprises means for generating a corona discharge in said field through which said fuel passes.

3. The arrangement according to claim 1 wherein said means for generating said electrical discharge comprises means for generating an arc discharge in said field through which said fuel passes.

4. A multiphase method of pretreating fuel to achieve activation of said fuel sufficient to enable hypergolic combustion comprising the steps of:
    heating each quantity of fuel to vaporize and partially activate said fuel;
    further activating said vaporized fuel in a phase distinct from said heating treatment phase by passing said heated vaporized fuel over a catalytic material to further partially activate said heated fuel generating an electrical discharge and passing said heated, vaporized, partially activated fuel through said electrical discharge.

5. The multiphase method of claim 4 wherein said step of generating said electrical field includes the step of generating a corona and further including the step of passing each quantity of said vaporized fuel through said corona.

6. The multiphase method of claim 4 wherein said step of generating said electrical field includes the step of generating an arc and further including the step of passing each quantity of said vaporized fuel through said arc.

7. An arrangement for multiphasic pretreatment of fuel prior to combustion in a combustion device comprising:
    a source of fuel under pressure;
    first means for heating and vaporizing fuel received from said source of fuel;
    catalytic activation means comprising a catalytic material disposed to partially activate said heated and vaporized fuel to a degree insufficient when combined with the activation effect of said first means to enable hypergolic combustion;
    means for irridating said partially activated fuel with ultraviolet radiation to completely activate said fuel to a degree enabling hypergolic combustion.

8. A multiphase method of pretreating fuel to achieve activation of said fuel sufficient to enable hypergolic combustion comprising the steps of:
    heating each quantity of fuel to vaporize and partially activate said fuel;
    further activating said vaporized fuel in a phase distinct from said heating treatment phase over a catalytic material to further partially activate said heated fuel; irradating said partially activated fuel with ultraviolet radiation whereby full activation of said fuel is achieved by the combined effects of each of said steps.

* * * * *

UNITED STATES PATENT AND TRADEMARK OFFICE
CERTIFICATE OF CORRECTION

PATENT NO. : 4,672,938

DATED : June 16, 1987

INVENTOR(S) : Lyle O. Hoppie et al

It is certified that error appears in the above-identified patent and that said Letters Patent is hereby corrected as shown below:

Column 1, lines 34, 36, 53 and 62, "dissassociated" should be --disassociated--.

Column 1, lines 41 and 47, "dissassociation" should be --disassociation--.

Column 1, line 43, "progagate" should be --propagate--.

Column 1, line 66, "12/28/85" should be --12/26/85--.

Column 2, line 60, "specifications" should be --specification--.

Column 3, line 59, "will" should be --with--.

Column 4, line 16, "spongey" should be --spongy--.

Column 4, line 20, "dissassociation" should be --disassociation--.

Column 5, line 53 (Claim 1), "treated" should be --treated fuel--.

Column 6, line 42 (Claim 7), "irridating" should be --irradiating--

UNITED STATES PATENT AND TRADEMARK OFFICE
CERTIFICATE OF CORRECTION

PATENT NO. : 4,672,938

DATED : June 16, 1987

INVENTOR(S) : Lyle O. Hoppie et al

It is certified that error appears in the above-identified patent and that said Letters Patent is hereby corrected as shown below:

Column 6, line 53 (Claim 8), "irradating" should be -- irradiating --.

Signed and Sealed this

Thirteenth Day of October, 1987

Attest:

DONALD J. QUIGG

Attesting Officer

Commissioner of Patents and Trademarks